US010723471B2

(12) United States Patent
Stuart et al.

(10) Patent No.: US 10,723,471 B2
(45) Date of Patent: Jul. 28, 2020

(54) METHOD AND SYSTEM FOR MOUNTING AN AIRCRAFT ENGINE

(71) Applicant: General Electric Company, Schenectady, NY (US)

(72) Inventors: Alan Roy Stuart, Cincinnati, OH (US); Thomas Ory Moniz, Loveland, OH (US); Jeffrey Donald Clements, Mason, OH (US); Joseph George Rose, Mason, OH (US)

(73) Assignee: General Electric Company, Schenectady, NY (US)

( * ) Notice: Subject to any disclaimer, the term of this patent is extended or adjusted under 35 U.S.C. 154(b) by 459 days.

(21) Appl. No.: 15/622,290

(22) Filed: Jun. 14, 2017

(65) Prior Publication Data
US 2018/0362170 A1    Dec. 20, 2018

(51) Int. Cl.
*B64D 27/26*    (2006.01)
*B64D 27/12*    (2006.01)
*B64D 29/02*    (2006.01)

(52) U.S. Cl.
CPC .............. *B64D 27/26* (2013.01); *B64D 27/12* (2013.01); *B64D 29/02* (2013.01); *B64D 2027/266* (2013.01); *B64D 2027/268* (2013.01)

(58) Field of Classification Search
CPC .............. B64D 27/26; B64D 2027/266; B64D 2027/268; B64D 27/12
See application file for complete search history.

(56) References Cited

U.S. PATENT DOCUMENTS

| | | | |
|---|---|---|---|
| 3,085,773 A | 4/1963 | Anstrom et al. | |
| 3,844,115 A | 10/1974 | Freid | |
| 4,437,627 A | 3/1984 | Moorehead | |
| 4,603,821 A * | 8/1986 | White | B64D 27/18 244/54 |
| 5,181,675 A | 1/1993 | Lardellier et al. | |
| 5,320,307 A | 6/1994 | Spofford et al. | |
| 5,452,575 A | 9/1995 | Freid | |
| 5,467,941 A | 11/1995 | Chee | |

(Continued)

FOREIGN PATENT DOCUMENTS

WO    2016112187 A2    7/2016

OTHER PUBLICATIONS

The Constructor, "Determinate and Indeterminate Structures," from website https://theconstructor.org/structural-engg/analysis/determinate-and-indeterminate-structures/3483/ (12 pgs).

*Primary Examiner* — Philip J Bonzell
(74) *Attorney, Agent, or Firm* — Dority & Manning, P.A.

(57) ABSTRACT

A system for mounting an engine to an aircraft includes an engine forward mount angled toward the forward end of the engine at a first angle. At least two thrust links extend between an engine aft mount to a link support connection at a second angle. The engine aft mount is angled toward the forward end of the engine at a third angle. A projection of a load vector of the engine forward mount onto a vertical plane extending through the axis of rotation of the engine and a projection of a load vector of each of the at least two thrust links onto the vertical plane intersect the axis of rotation of the engine within a first vertical plane segment extending between a forward end of a nose of a fan assembly and forward of a forward mount interface.

20 Claims, 6 Drawing Sheets

(56) References Cited

U.S. PATENT DOCUMENTS

| | | | |
|---|---|---|---|
| 5,746,391 A * | 5/1998 | Rodgers | B64D 27/18 244/54 |
| 6,398,161 B1 | 6/2002 | Jule et al. | |
| 6,401,448 B1 | 6/2002 | Manteiga et al. | |
| 6,708,925 B2 * | 3/2004 | Udall | B64D 27/16 244/54 |
| 6,935,591 B2 * | 8/2005 | Udall | B64D 27/16 244/54 |
| 7,806,363 B2 | 10/2010 | Udall et al. | |
| 8,104,708 B2 * | 1/2012 | Chouard | B64D 27/26 244/54 |
| 8,191,823 B2 * | 6/2012 | Guering | B64C 15/12 244/54 |
| 8,215,580 B2 * | 7/2012 | Balk | B64D 27/26 244/54 |
| 8,322,651 B2 | 12/2012 | Levert et al. | |
| 8,438,859 B2 | 5/2013 | Vetters | |
| 8,622,341 B2 * | 1/2014 | Marechal | B64D 27/26 244/54 |
| 8,727,269 B2 * | 5/2014 | Stuart | F02C 7/20 244/53 R |
| 9,016,068 B2 | 4/2015 | Martin et al. | |
| 9,248,921 B2 | 2/2016 | West | |
| 9,567,090 B2 * | 2/2017 | Gallet | B64D 27/12 |
| 9,664,112 B2 * | 5/2017 | Balk | B64D 27/18 |
| 10,144,524 B2 * | 12/2018 | Binks | B64D 27/26 |
| 2004/0245383 A1 * | 12/2004 | Udall | B64D 27/16 244/54 |
| 2009/0189014 A1 * | 7/2009 | Balk | B64D 27/26 244/54 |
| 2010/0206981 A1 | 8/2010 | Baillard | |
| 2011/0001002 A1 * | 1/2011 | Chouard | B64D 27/26 244/54 |
| 2011/0127371 A1 | 6/2011 | Takeuchi | |
| 2011/0192933 A1 * | 8/2011 | Guering | B64C 15/12 244/54 |
| 2011/0259997 A1 * | 10/2011 | Marechal | B64D 27/26 244/54 |
| 2012/0305700 A1 * | 12/2012 | Stuart | F02C 7/20 244/54 |
| 2013/0327058 A1 * | 12/2013 | Balk | B64D 27/18 60/797 |
| 2014/0084129 A1 | 3/2014 | Sandy | |
| 2014/0369810 A1 * | 12/2014 | Binks | B64D 27/26 415/108 |
| 2015/0013142 A1 | 1/2015 | West | |
| 2015/0069176 A1 | 3/2015 | Stretton et al. | |
| 2016/0167798 A1 * | 6/2016 | Prentice | B64D 27/26 244/54 |
| 2016/0167808 A1 | 6/2016 | Iliopoulos et al. | |
| 2017/0057652 A1 | 3/2017 | Journade et al. | |

\* cited by examiner

METHOD AND SYSTEM FOR MOUNTING AN AIRCRAFT ENGINE

BACKGROUND

The present disclosure generally relates to systems and methods for mounting an aircraft engine to an aircraft. More particularly, this disclosure relates to a mounting system and method adapted to reduce backbone deflection that can occur in an aircraft engine as a result of aerodynamic, gravitational, inertial, and thrust loads during aircraft operation.

At least some known gas turbine engines, such as turbofans, include a fan, a core engine, and a power turbine. The core engine includes at least one compressor, a combustor, and a high-pressure turbine coupled together in a serial flow relationship. More specifically, the compressor and high-pressure turbine are coupled through a shaft to form a high-pressure rotor assembly. Air entering the core engine is mixed with fuel and ignited to form a high energy gas stream. The high energy gas stream flows through the high-pressure turbine to rotatably drive the high-pressure turbine such that the shaft rotatably drives the compressor. The gas stream expands as it flows through a power or low-pressure turbine positioned aft of the high-pressure turbine. The low-pressure turbine includes a rotor assembly having a fan coupled to a drive shaft. The low-pressure turbine rotatably drives the fan through the drive shaft. Turbine engine performance is enhanced when the fan operates at a relatively low rotational speed and with a low pressure ratio.

As engine bypass ratios are increased, the larger fan and increased airflow result in higher loads at take-off rotation. A large lift load is created on the engine inlet assembly as internal and some external airflow is turned to align with the engine axis of rotation. This load represents a major contribution to the engine backbone bending moment. The engine thrust also creates a pitching moment depending on whether the focal point of the engine's mounting system is on, above or below the engine center-line. The smaller core diameters associated with increased bypass ratio engines, together with increased pressure ratios and smaller blade heights, make the core engine more sensitive to backbone bending. At least some engines include more open tip clearances, to accommodate backbone bending. However, such open tip clearances may result in a reduction in fuel efficiency.

BRIEF DESCRIPTION

In one aspect, a mounting system for mounting an engine to an aircraft is provided. The engine is rotatable about an axis of rotation and includes a center of gravity, a forward end, and an aft end opposite the forward end. The mounting system includes a rigid mounting structure, an engine case, an engine aft mount, a link support connection, a fan case, and at least two thrust links. The rigid mounting structure is coupled to a wing of the aircraft and includes at least a forward mount interface, a link mount interface, and an aft mount interface. Each of the forward mount interface, the link mount interface, and the aft mount interface are configured to receive a thrust component of a load. The engine case surrounds the axis of rotation of the engine and includes a link support connection. The fan case at least partially surrounds the engine case. The fan case includes an engine forward mount coupled to the forward mount interface. The engine forward mount is angled toward the forward end of the engine at a first angle with respect to the axis of rotation. The first angle is an acute angle. The at least two thrust links extend between the link mount interface and the link support connection at a second angle with respect to the axis of rotation. The engine aft mount is spaced apart from the link support connection along an upper portion of the engine case. The engine aft mount is coupled to the aft mount interface. The engine aft mount is angled toward the forward end of the engine at a third angle with respect to the axis of rotation. The third angle may be an acute or obtuse angle. A projection of a load vector of the engine forward mount onto a vertical plane extending through the axis of rotation of the engine and a projection of a load vector of each thrust link of the at least two thrust links onto the vertical plane intersect each other and the axis of rotation of the engine within a first vertical plane segment. The first vertical plane segment extends between a forward end of a nose of a fan assembly and forward of the forward mount interface. A projection of a load vector of the engine aft mount onto a vertical plane extending through the axis of rotation of the engine intersects the axis of rotation of the engine within at least one of a second vertical plane segment and a third vertical plane segment. The second vertical plane segment extends between the center of gravity and forward of the aft mount interface. The third vertical plane segment extends between the aft end of the engine and aft of the aft mount interface.

Optionally, the rigid mounting structure is coupled to a wing of the aircraft. Also optionally the second vertical plane segment extends between the center of gravity and forward of the aft mount interface. Optionally, the first angle is less than eighty degrees. Optionally, the first angle is less than seventy degrees. Optionally, the first angle is less than sixty-five degrees. Optionally, the first angle is less than sixty degrees. Optionally, the third angle is less than eighty-five degrees. Optionally, the third angle is greater than ninety-five degrees. Optionally, the third angle is less than eighty degrees. Optionally, the third angle is less than seventy-five degrees. Optionally, the third angle is greater than one hundred degrees. Optionally, the third angle is greater than one hundred-five degrees. Optionally, the third angle is greater than one hundred-ten degrees.

In another aspect, a method of coupling an engine to an aircraft wing is provided. The method includes coupling a rigid mounting structure to the aircraft wing. The rigid mounting structure includes a forward mount interface, a link mount interface, and an aft mount interface. Each of the forward mount interface, the link mount interface, and the aft mount interface are configured to receive a thrust component of a load. The method includes coupling an engine structure about the engine such that the engine structure surrounds an axis of rotation of the engine. The method includes coupling an engine forward mount to the forward mount interface at a first angle with respect to the axis of rotation. The engine structure includes a thrust link support connection along an upper portion of the engine structure. The method also includes coupling at least two thrust links of a linkage structure to the link mount interface at a second angle with respect to the axis of rotation and coupling an engine aft mount to the aft mount interface at a third angle with respect to the axis of rotation. A projection of a load vector of the engine forward mount onto a vertical plane extending through the axis of rotation of the engine and a projection of a load vector of each thrust link of the at least two thrust links onto the vertical plane intersect the axis of rotation of the engine within a first vertical plane segment extending between a forward end of a nose of a fan assembly and forward of the forward mount interface. A projection of a load vector of the engine aft mount onto the vertical plane intersects the axis of rotation of the engine within at least one of a second vertical plane segment and a third vertical plane segment. The second vertical plane segment extends between a center of gravity of the engine and forward of the aft mount interface. The third vertical plane segment extends between an aft end of the engine and aft of the aft mount interface.

Optionally, the method includes the step of coupling the engine forward mount and coupling the at least two thrust links such that the projection of the load vector of the engine forward mount and each thrust link of the at least two thrust links intersect within a blade tip radius of the axis of rotation of the engine. The method also optionally includes the step of pivotably coupling the at least two thrust links of the linkage structure to the link mount interface.

In yet another aspect, a mounting system for an engine of an aircraft that includes a core engine including a compressor and a low-pressure turbine arranged axisymmetrically about an axis of rotation is provided. The mounting system includes a mounting structure coupled to an exterior of the aircraft and a forward mount interface coupled to the mounting structure forward of the center of gravity of the engine. The forward mount interface is coupled to a fan frame of the engine forming a first angle with respect to the axis of rotation. The mounting system also includes a link mount interface coupled to the mounting structure aft of the center of gravity of the engine. The link mount interface is coupled to a turbine frame of the engine through at least two thrust links and forming a second angle with respect to the axis of rotation and an aft mount interface coupled to the mounting structure aft of the low-pressure turbine. The aft mount interface is coupled to the turbine frame forming a third angle with respect to the axis of rotation. Each of the forward mount interface, the link mount interface, and the aft mount interface are configured to receive a thrust component generated by the engine.

Optionally, the engine includes a compressor and the forward mount interface is coupled to the mounting structure forward of an axial midpoint of the compressor. Also optionally, the link mount interface may be coupled to the mounting structure aft of an axial midpoint of the compressor. The first angle may be an acute angle. Optionally, the first angle is less than approximately eighty degrees and greater than approximately sixty degrees. Also optionally, the first angle is less than approximately seventy degrees and greater than approximately sixty-five degrees. The first angle may be less than approximately sixty degrees and greater than approximately ten degrees. Optionally, the second angle is an acute angle and the third angle may be at least one of an acute angle and an obtuse angle. Also optionally, the third angle is greater than approximately ninety-five degrees such that engine aft mount intersects axis of rotation aft of engine aft mount. A projection of a load vector of the forward mount interface and each thrust link of the at least two thrust links may intersect within a blade tip radius of the axis of rotation of the engine.

DRAWINGS

These and other features, aspects, and advantages of the present disclosure will become better understood when the following detailed description is read with reference to the accompanying drawings in which like characters represent like parts throughout the drawings, wherein:

FIG. 1 is a perspective view of an aircraft in accordance with an example embodiment of the present disclosure.

FIG. 2 side elevation view of a gas turbine engine that may be used with the aircraft shown in FIG. 1.

Figure 1:
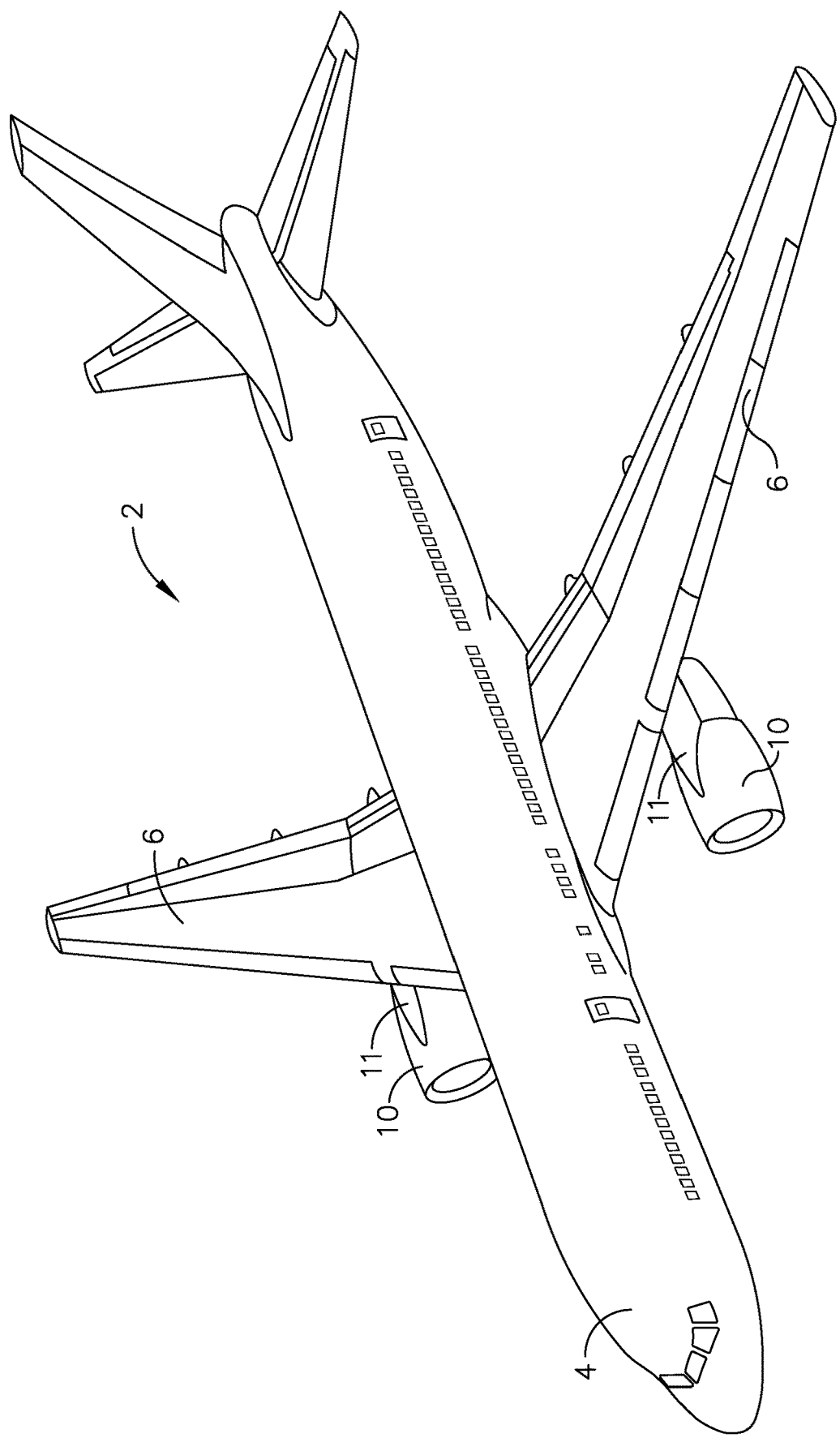

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the terms "axial" and "axially" refer to directions and orientations that extend substantially parallel to an axis of rotation or centerline of an engine. Moreover, the terms "radial" and "radially" refer to directions and orientations that extend substantially perpendicular to the centerline of the engine. In addition, as used herein, the terms "circumferential" and "circumferentially" refer to directions and orientations that extend arcuately about the centerline of the engine.

Embodiments of the present disclosure relate to mounting systems for mounting turbine engine assemblies to an exterior of an aircraft, for example, on a wing or fuselage of the aircraft. More specifically, the mounting systems described herein are designed to reduce or eliminate backbone bending of the engine within the engine case during certain engine operating conditions. In one embodiment, a forward-leaning engine forward mount and a forward- or aft-leaning engine aft mount are coupled between a pylon of the aircraft wing and the inner engine structure of the engine. As viewed from the side, the forward-leaning engine forward mount and the forward- or aft-leaning engine aft mount each define load vectors extending therefrom. The load vectors extending from the engine aft mount intersect the axis of rotation of the engine at an aft focal point in an aft portion of the engine. The mounting system further includes a forward-leaning linkage structure coupled between the link mount interface and the inner engine structure of the engine. As viewed from the side, the linkage structure defines load vectors extending therefrom and intersecting the load vectors extending from the engine forward mount at a forward focal point within a blade tip radius of the axis of rotation of the engine and aft of the engine inlet assembly. The selection of the position of the forward focal point and the aft focal point facilitates reducing or eliminating backbone bending of the engine during various engine operational modes/maneuver loads.

Locating the forward focal point of the mounting system near a location relative to the inlet loading and engine centerline reduces backbone bending to negligible levels in some embodiments, even in large turbofan gas turbine engines that generate high thrust levels. It is not desirable to have the focal point too far forward because of increased bending due to gust or "g" loads. Additionally, the mounting system is capable of achieving this benefit while avoiding a substantial penalty in cost or weight typically associated with prior efforts to reduce backbone bending.

Referring now to the drawings, in which like numerals refer to the same elements throughout the several views, FIG. 1 is a perspective view of an aircraft 2 in accordance with an example embodiment of the present disclosure. In the example embodiment, aircraft 2 includes a fuselage 4 and a pair of laterally extending wings 6. Each wing includes a gas turbine engine 10, which may be embodied in a high-bypass turbofan gas turbine engine, fixedly coupled to wing 6 through a rigid mounting structure 11, such as a pylon.

Figure 2:
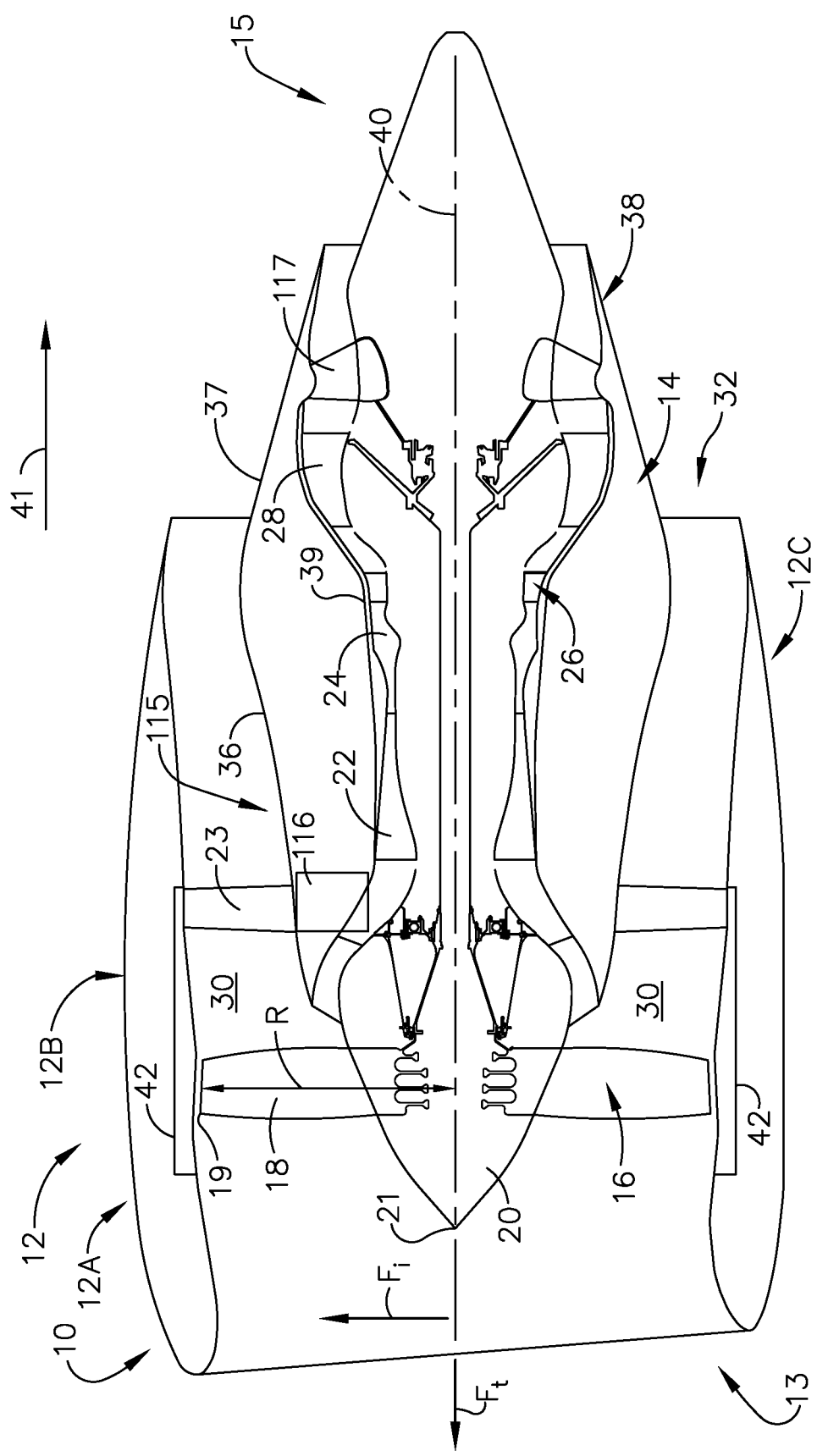

FIG. 2 schematically represents a gas turbine engine 10 that may be used with aircraft 2 (shown in FIG. 1). In the example embodiment, gas turbine engine 10 includes a forward end 13 and an aft end 15. Gas turbine engine 10 is schematically represented as including a nacelle 12 and a core engine 14. A fan assembly 16 located forward of core engine 14 includes a spinner nose 20 projecting forwardly from an array of radially extending fan blades 18 to a spinner nose tip 21. Fan Blades 18 include a blade tip 19. Core engine 14 is schematically represented as including a high-pressure compressor (HPC) 22, a combustor 24, and a high-pressure turbine (HPT) 26. Gas turbine engine 10 also includes a low-pressure turbine (LPT) 28. A large portion of the air that enters fan assembly 16 is bypassed to the rear of gas turbine engine 10 to generate additional engine thrust. The bypassed air passes through an annular-shaped bypass duct 30 between nacelle 12 and a core cowl 36, and exits bypass duct 30 through a fan exit nozzle 32. Core cowl 36 defines the radially inward boundary of bypass duct 30, and provides an aft engine case transition surface 37 to a primary exhaust nozzle 38 that extends aftward from core engine 14. Core cowl 36 also circumscribes an inner engine case 39. Nacelle 12 defines the radially outward boundary of bypass duct 30, and the bypassed fan air flows between bypass duct flow surfaces defined by nacelle 12 and core cowl 36 before being exhausted through fan exit nozzle 32.

Nacelle 12 is typically composed of three primary elements that define the external boundaries of nacelle 12: an inlet assembly 12A located upstream of the fan assembly 16, a fan cowl 12B interfacing with an engine fan case 42 that surrounds fan blades 18, and a thrust reverser assembly 12C located aft of fan cowl 12B. Furthermore, core cowl 36 is a component of nacelle 12 and provides a shell around core engine 14. In the example embodiment, fan case 42 is configured to be supported relative to core engine 14 by a plurality of circumferentially-spaced outlet guide vanes 23.

When installed on aircraft 2, gas turbine engine 10 is supported by a rigid mounting structure 11 of aircraft 2 (shown in FIG. 1), for example, a pylon (shown in FIG. 1) that extends outward from aircraft 2. In the case of an engine mounted to a wing, rigid mounting structure 11 (shown in FIG. 1) typically extends downwardly beneath the wing. Structural components of rigid mounting structure 11 are connected to an engine structure 115 of core engine 14 that supports the rotating components of HPC 22, HPT 26, and LPT 28. In the exemplary embodiment, engine structure 115 includes an engine frame or a fan frame. More specifically, engine structure 115 typically includes a fan frame 116 adjacent HPC 22 coupled to inner engine case 39, and an turbine frame 117 adjacent LPT 28 coupled to inner engine case 39. Inner engine case 39 is often referred to as the backbone of gas turbine engine 10. Aircraft engines of the type represented in FIG. 2 are typically mounted and secured to aircraft 2 in two planes normal to an axis of rotation 40 of gas turbine engine 10. One mount is typically connected to fan frame 116 often just rearward of fan assembly 16, and a second mount is typically connected to turbine frame 117 near LPT 28.

During climb and certain other aircraft operating modes, axis of rotation 40 is pitched relative to a direction 41 of approaching airflow, with the result that a forward lip of nacelle 12 can be subjected to upward aerodynamic loading. This aerodynamically-induced load, often referred to as the inlet load and represented by the vector $F_l$ in FIG. 2, is in addition to the thrust load, represented by the vector $F_t$ in FIG. 2. These loads induce bending moments in inner engine case 39 (backbone); with the result that inner engine case 39 is deflected (bends) from its concentric position about axis of rotation 40. Maintaining concentricity of inner engine case 39 about axis of rotation 40 is important from the standpoint of minimizing blade tip clearances within HPC 22, HPT 26, and LPT 28 of gas turbine engine 10, which has the beneficial effect of improving engine specific fuel consumption (SFC) and fuel burn. In addition, reduced backbone bending reduces the incidence of blade tip rub encounters with the surrounding engine structures (including engine fan case 42), which promotes in-service performance retention. Engines 10 with a longer interval for time on-wing to removal for service provide reduced service contract costs to their operators.

Figure 3:
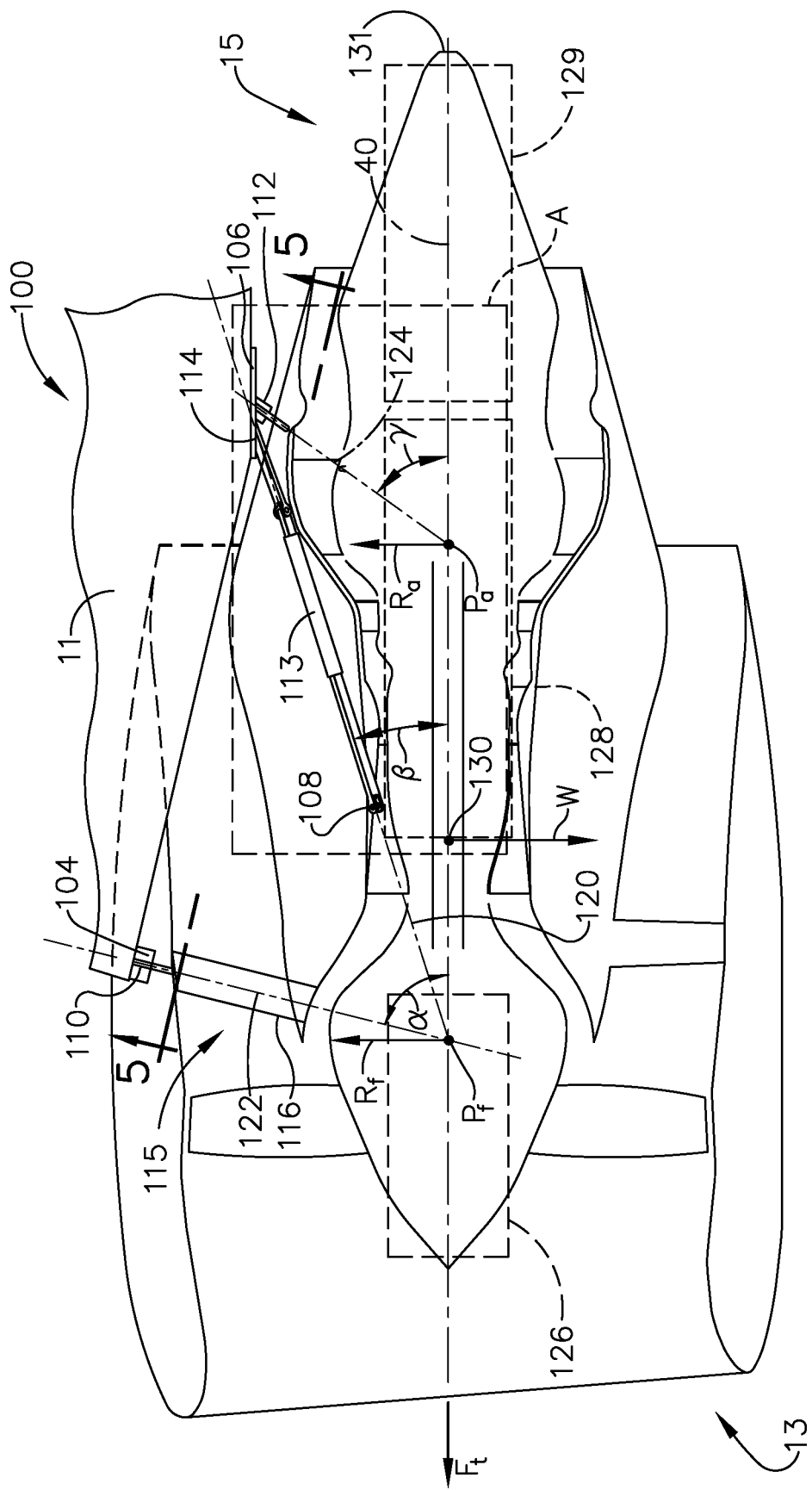
FIG. 3 is a side view of a gas turbine engine equipped with a system for mounting the engine to an aircraft wing support structure in accordance with an example embodiment of the present disclosure.
Figure 4:
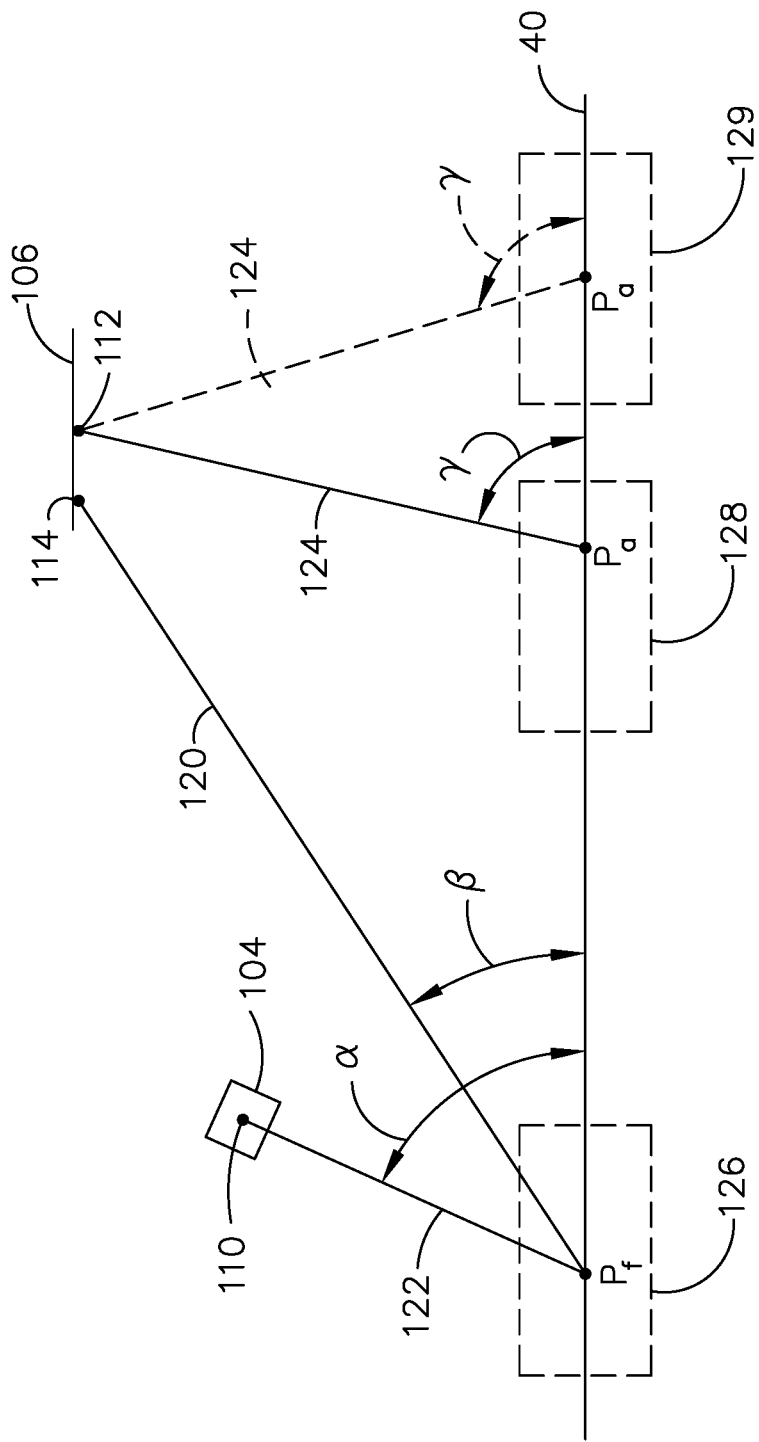
FIG. 4 is a beam diagram for the gas turbine engine shown in FIG. 1.
Figure 5:
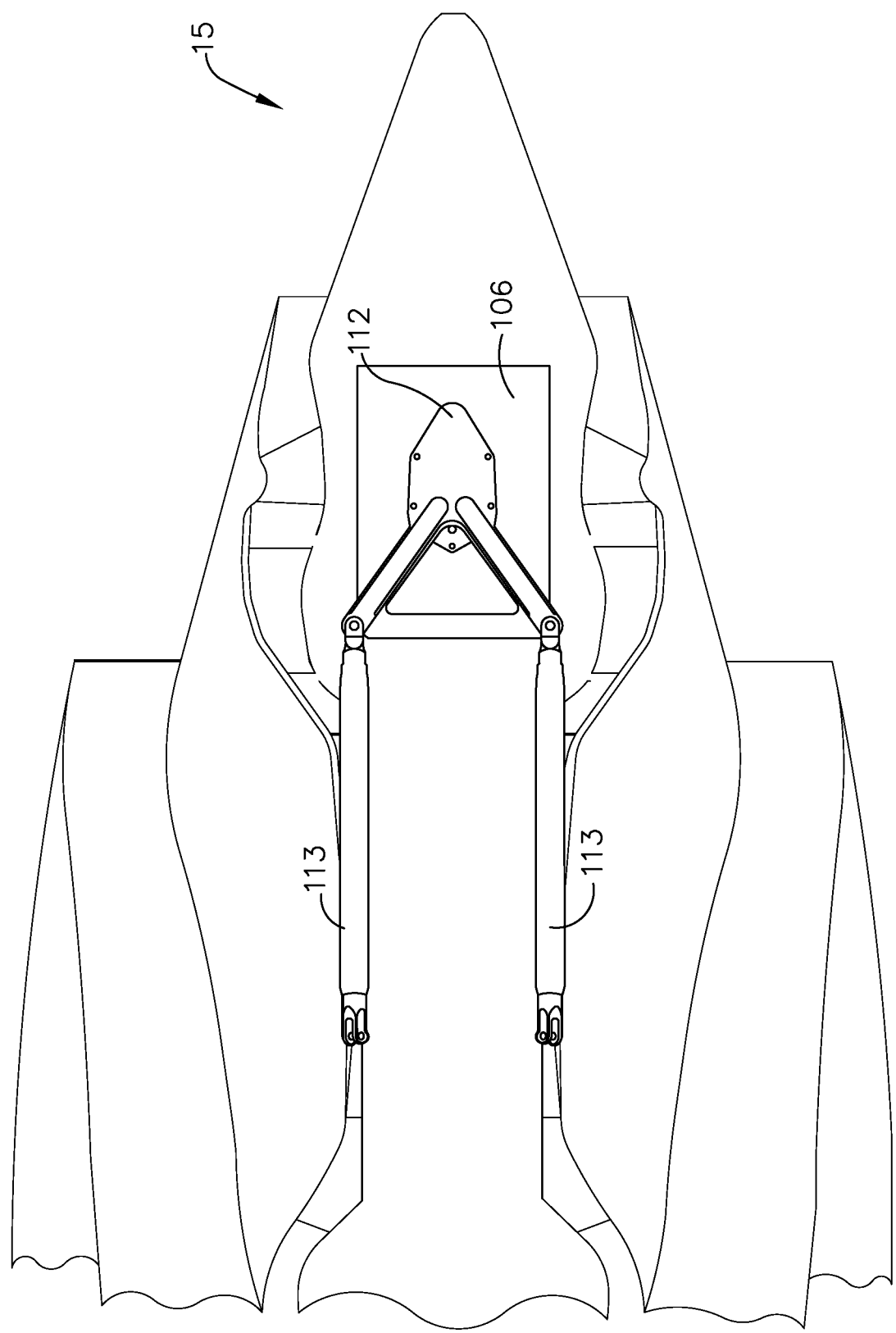
FIG. 5 is a bottom view taken of Line 5-5 shown in FIG. 3.
Figure 6:
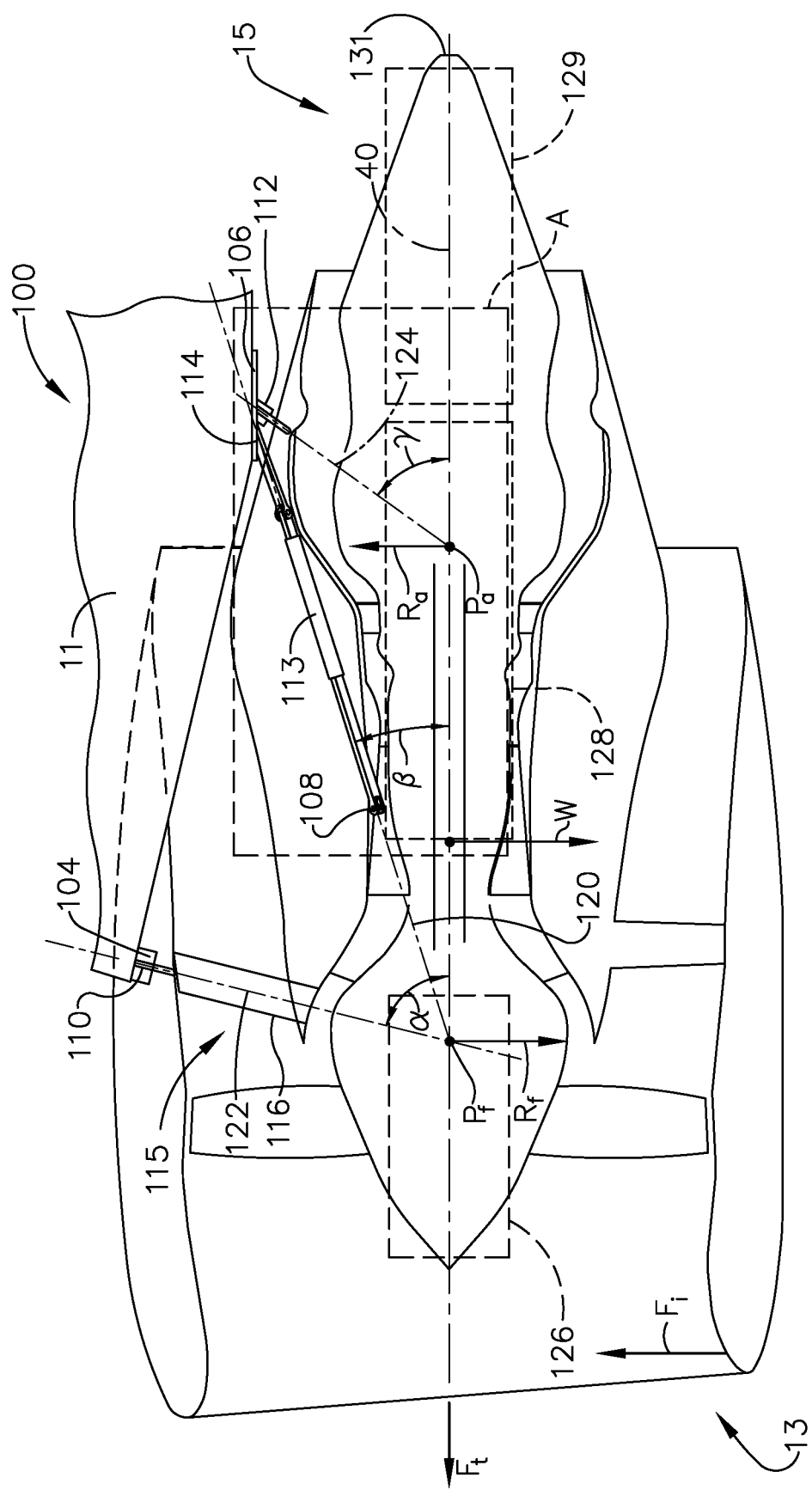
FIG. 6 represents loading conditions imposed on the engine and mounting system of FIG. 3.

FIG. 3 is a side view of an engine mounting system 100. In the example embodiment, engine mounting system 100 is used to couple gas turbine engine 10 to, for example, wing 6 of aircraft 2. FIG. 4 is a beam diagram for the gas turbine engine shown in FIG. 1. FIG. 5 is a bottom view taken of Line 5-5 (shown in FIG. 3). FIG. 3 represents gas turbine engine 10 in a nonoperational mode with the weight W of gas turbine engine 10 being the only load acting on engine mounting system 100. FIG. 6 represents gas turbine engine 10 in a take-off or cruise loading condition where thrust from gas turbine engine 10 propels aircraft 2 at a high rate of speed down the runway prior to takeoff or through the air. Engine mounting system 100 can be installed in a gas turbine engine of the type represented in FIGS. 1 and 2 and therefore, as a matter of convenience, the same numbers used in FIGS. 1 and 2 to identify gas turbine engine 10 and its components will be used in FIGS. 3 through 6 to identify the same or functionally equivalent components. To facilitate the description of the engine mounting system 100 provided below, the terms "vertical," "horizontal," "lateral,"

"forward," "aft," "upper," "lower," "above," "below," etc., may be used in reference to the perspective of the installation and orientation of gas turbine engine 10 on aircraft 2, and therefore are relative terms that indicate the construction, installation and use of gas turbine engine 10. However, it is within the scope of the disclosure that engine mounting system 100 could be installed on an engine that markedly differs from gas turbine engine 10 shown in the drawings, or installed at other points of aircraft 2, for example, the fuselage. Finally, it is foreseeable that engine mounting system 100 could find uses in applications other than aircraft engines.

As shown in FIG. 3, engine mounting system 100 includes a rigid mounting structure 11, such as a pylon, coupled to the engine support structure of aircraft wing 6 (shown in FIG. 1) through, for example, a clevis and lug type connector with a uni-ball or a spherical bearing. Rigid mounting structure 11 is also coupled to gas turbine engine 10 and includes a forward mount interface 104 and an aft mount interface 106. In the exemplary embodiment, each of forward mount interface 104 and aft mount interface 106 receives at least a portion of a thrust component of a load in certain engine operating modes. Engine mounting system 100 also includes engine structure 115 surrounding axis of rotation 40. In the exemplary embodiment, engine structure 115 includes a link support connection 108 spaced apart from aft mount interface 106.

In the exemplary embodiment, engine mounting system 100 also includes an engine forward mount 110 and an engine aft mount 112 coupled between engine structure 115 and rigid mounting structure 11 and configured to secure engine structure 115 to rigid mounting structure 11. Engine mounting system 100 further includes a link mount interface 114 coupled to rigid mounting structure 11 aft of an axial midpoint of HPC 22 and between link support connection 108 and aft mount interface 106 and configured to secure engine structure 115 to rigid mounting structure 11. Typically, rigid mounting structure 11, engine structure 115, engine forward mount 110, engine aft mount 112, and link mount interface 114 form a statically determinate structure. Link mount interface 114 includes at least two thrust links 113. As viewed in the side view of FIG. 3, both of the at least two thrust links 113 form the same angle β with respect to axis of rotation 40. As illustrated in FIG. 5, the at least two thrust links 113 are approximately parallel to each other.

Engine forward mount 110 is pivotably coupled at one end to forward mount interface 104 and is also pivotably coupled at the opposite end thereof to fan frame 116. In the exemplary embodiment, engine forward mount 110 is coupled between rigid mounting structure 11 and fan frame 116 such that engine forward mount 110 defines a first angle α with respect to axis of rotation 40. In the exemplary embodiment, first angle α is an acute angle. In an embodiment, first angle α is less than approximately eighty degrees and greater than approximately sixty degrees. In another embodiment, first angle α is less than approximately seventy degrees and greater than approximately sixty-five degrees. In another embodiment, first angle α is less than approximately sixty degrees and greater than approximately ten degrees In the exemplary embodiment, the at least two thrust links 113 (only one shown in FIG. 3) extend between a respective link mount interface 114 on rigid mounting structure 11 to link support connection 108 on engine structure 115. More specifically, the at least two thrust links 113 are pivotably coupled at one end to link mount interface 114 and also pivotably coupled at the opposite end thereof to link support connection 108. In the exemplary embodiment, the at least two thrust links 113 are coupled between rigid mounting structure 11 and link support connection 108 such that the at least two thrust links 113 define a second angle β with respect to axis of rotation 40. In the exemplary embodiment, second angle β is an acute angle.

Engine aft mount 112 is pivotably coupled at one end to aft mount interface 106 and is also pivotably coupled at the opposite end thereof to turbine frame 117. In the exemplary embodiment, engine aft mount 112 is coupled between rigid mounting structure 11 and turbine frame 117 such that engine aft mount 112 defines a third angle γ with respect to axis of rotation 40. In the exemplary embodiment, third angle γ is either an acute angle or an obtuse angle. In an embodiment, third angle γ is less than approximately eighty-five degrees. In another embodiment, third angle γ is less than approximately eighty degrees. In another embodiment, third angle γ is less than approximately seventy-five degrees. In an embodiment, third angle γ is greater than approximately ninety-five degrees such that engine aft mount 112 intersects axis of rotation 40 aft of engine aft mount 112. In another embodiment, third angle γ is greater than approximately one hundred degrees such that engine aft mount 112 intersects axis of rotation 40 aft of engine aft mount 112. In another embodiment, third angle γ is greater than approximately one hundred-five degrees such that engine aft mount 112 intersects axis of rotation 40 aft of engine aft mount 112. In another embodiment, third angle γ is greater than approximately one hundred-ten degrees such that engine aft mount 112 intersects axis of rotation 40 aft of engine aft mount 112.

Engine forward mount 110, engine aft mount 112, and link mount interface 114 provide a connection between gas turbine engine 10 and rigid mounting structure 11 that significantly reduces backbone bending/deflection within core engine 14 that would otherwise result from thrust and inlet loads of the type previously described in reference to FIG. 2. In some embodiments, backbone bending/deflection may potentially be reduced to negligible levels or even zero.

As shown in FIG. 3, engine forward mount 110 defines a first load vector 122 of a force (or forces within the same plane) transmitted through engine forward mount 110. Similarly, the at least two thrust links 113 define a second load vector 120 of a force (or forces within the same plane) transmitted through the at least two thrust links 113. Additionally, engine aft mount 112 defines a third load vector 124 of a force (or forces within the same plane) transmitted through engine aft mount 112.

For purposes of illustration, a vertical plane extending through axis of rotation 40 is defined as including a first vertical plane segment 126, a second vertical plane segment 128, and a third vertical plane segment 129. In the exemplary embodiment, a projection of first load vector 122 and a projection of second load vector 120 onto the vertical plane intersect at a point that lies within first vertical plane segment 126. First vertical plane segment 126, in a first embodiment, extends from a region forward of engine forward mount 110 forward to approximately spinner nose tip 21. In a second embodiment, first vertical plane segment 126 extends from approximately a forward end of HPC 22 forward to a forward end of fan assembly 16. In other embodiments, first vertical plane segment 126 is rotated approximately twenty-five degrees to approximately thirty degrees counterclockwise with respect to the view of FIG. 3. More specifically, a projection of first load vector 122 and a projection of second load vector 120 onto first vertical plane segment 126 intersect with each other at a forward focal point $P_f$, which, in some embodiments, may lie within a blade tip radius R of fan blades 18. In other embodiments, forward focal point $P_f$, may lie within fifty percent of blade tip radius R. In still other embodiments, forward focal point $P_f$, may lie within twenty-five percent of blade tip radius R. In yet other embodiment, forward focal point $P_f$, may lie within a range of between zero percent and forty percent of blade tip radius R. As used herein, blade tip radius R refers to a distance between axis of rotation 40 and a tip of fan blade 18. The projections of first load vector 122 and second load vector 120 onto first vertical plane segment 126 can intersect each other within the boundaries of first vertical plane segment 126 within a blade tip radius R of axis of rotation 40.

In the exemplary embodiment, a projection of third load vector 124 onto the vertical plane intersects axis of rotation 40 at a point that lies within at least one of second vertical plane segment 128 and third vertical plane segment 129. Second vertical plane segment 128, in a first embodiment, extends from a center of gravity 130 of gas turbine engine 10, aft to a region forward of aft mount interface 106, and third vertical plane segment 129 extends from a region aft of aft mount interface 106 to an aft tip 131 of gas turbine engine 10. For example, where third angle γ is an acute angle, the projection of third load vector 124 intersects with axis of rotation 40 at an aft focal point $P_a$ within the boundaries of second vertical plane segment 128 (as shown in FIG. 3). For another example, where third angle γ is an obtuse angle, the projection of third load vector 124 intersects with axis of rotation 40 at an alternative aft focal point $P_a$ within the boundaries of third vertical plane segment 129.

The capability of engine mounting system 100 to potentially reduce backbone bending/deflection to low values or zero can be further understood from reference to FIGS. 3-6. FIG. 3 diagrammatically represents relative force vectors that exist parallel to the weight, W, of gas turbine engine 10 (no engine operation), and indicates that the engine weight is shared between engine forward mount 110, engine aft mount 112, and link mount interface 114. More specifically, FIG. 3 represents a first mode of gas turbine engine 10 operation, such as during take-off while aircraft 2 is traveling down the runway or during level flight when additional thrust is required.

As shown in FIG. 3, in addition to weight W, engine forward mount 110, engine aft mount 112, and link mount interface 114 are subjected to additional forces resulting from engine thrust, $F_t$. For example, engine thrust $F_t$ causes a forward vertical reaction $R_f$ at forward focal point $P_f$ acting in an opposite direction to the weight force W reaction. When the focal point $P_f$ is not on the engine center-line, engine thrust $F_t$ may increase or decrease the aft mount reaction $R_a$. For example, when the intersection of first load vector 122 and second load vector 120 (focal point $P_f$) is below axis of rotation 40, as can be seen in FIG. 3, engine thrust $F_t$ causes an aft reaction $R_a$ at aft focal point $P_a$ acting in opposition to the weight force W reaction.

FIG. 4 is a beam diagram for gas turbine engine 10 (shown in FIG. 1). In the example embodiment, gas turbine engine 10 is represented by axis of rotation 40. The load vectors associated with gas turbine engine 10 are represented by first load vector 122, which extends between engine forward mount 110 at forward mount interface 104 and focal point $F_p$. First load vector 122 defines a first angle α with respect to axis of rotation 40. Second load vector 120 extends between engine link mount interface 114 at aft mount interface 106 and focal point $P_f$. Second load vector 120 defines second angle β with respect to axis of rotation 40. Third load vector 124 extends between engine aft mount 112 at aft mount interface 106 and focal point $P_a$. Second load vector 120 defines second angle β with respect to axis of rotation 40.

The vertical plane extending through axis of rotation 40 is defined as including first vertical plane segment 126, second vertical plane segment 128, and third vertical plane segment 129. In the exemplary embodiment, the projection of first load vector 122 and the projection of second load vector 120 onto the vertical plane intersect at a point that lies within first vertical plane segment 126.

The projection of third load vector 124 onto the vertical plane intersects axis of rotation 40 at a point that lies within second vertical plane segment 128 or third vertical plane segment 129. For example, where third angle γ is an acute angle, the projection of third load vector 124 intersects with axis of rotation 40 at an aft focal point $P_a$ within the boundaries of second vertical plane segment 128 (as shown also in FIG. 3). For another example, where third angle γ is an obtuse angle, the projection of third load vector 124 intersects with axis of rotation 40 at an alternative aft focal point $P_a$ within the boundaries of third vertical plane segment 129.

FIG. 6 diagrammatically represents conditions that exist during a second mode of gas turbine engine 10 operation, such as during lift-off or when aircraft 2 is climbing. As shown in FIG. 6, engine forward mount 110, engine aft mount 112, and link mount interface 114 are subjected to additional forces resulting from engine thrust, $F_t$, but are also subjected to inlet load $F_i$ caused by the increased angle of attack of aircraft 2 during lift-off and climbing load conditions. Specifically, as can be seen in FIG. 6, engine thrust $F_t$ and inlet load $F_i$ cause forward reaction $R_f$ at focal point $P_f$ acting in a downward direction. Similarly, inlet load $F_i$ causes a change in aft reaction $R_a$ acting in an upward direction. In the loading condition shown in FIG. 6, forward reaction $R_f$ is reduced or may become negative and the aft reaction $R_a$ is increased as compared to the loading conditions shown in FIG. 3. In the exemplary embodiment, the more forward the forward focal point $P_f$ and the aft focal point $P_a$, the smaller the increase in backbone bending due to inlet load $F_i$. Additionally, in the loading condition shown in FIG. 6, aft reaction $R_a$ is larger than aft reaction $R_a$ during the loading conditions shown in FIG. 3. As aircraft 2 reaches cruise and levels out, inlet load $F_i$ decreases and forward and aft reactions $R_f$ and $R_a$ return to reacting the weight reaction W and thrust force $F_t$ only, as shown in FIG. 3. In the exemplary embodiment, as described herein, the location of focal point $P_f$, forward of HPC 22, engine structure 115, and a leading edge of core cowl 36 facilitate reduced backbone bending of gas turbine engine 10 during the lift-off and climbing load conditions.

In the exemplary embodiment, inlet load $F_i$ is indicated as being additionally present as a result of the aircraft being in a climb, during which nacelle 12 is subjected to upward aerodynamic loading as a result of axis of rotation 40 of gas turbine engine 10 being pitched upward relative to the direction of approaching airflow. Notably, FIG. 6 represents loads for engine thrust and inlet loads, $F_t$ and $F_i$, as imposing load moments in the same or opposite directions around forward focal point $P_f$ and aft focal point $P_a$ depending on whether the focal point $P_f$ is above or below axis of rotation 40. The result is that their moments can cancel each other to some extent if their distances relative to forward focal point $P_f$ and aft focal point $P_a$ are appropriate for their respective magnitudes of $F_t$ and $F_i$. By reducing the bending moment induced in gas turbine engine 10 by the inlet load $F_i$, and the thrust force $F_t$, the backbone of core engine 14 will be subjected to less bending or deflection.

The magnitude of the load in link support connection 108 under the conditions represented in FIG. 6 will vary depending upon the actual values of weight W, thrust $F_t$, and inlet load $F_i$ experienced during a flight. Consequently, the location of focal point $P_f$ being forward of engine structure 115 is a preferred aspect of engine mounting system 100 in order to significantly reduce bending and deflection of the backbone of core engine 14. In addition, the focal point $P_f$ is preferably located in close proximity to the intersection of the engine thrust and inlet load vectors, $F_t$ and $F_i$, so as to be located within inlet assembly 12A. In practice, the distributed mass of the engine also contributes to engine backbone bending and the best position of the focal point will be found within the area claimed to minimize all sources of backbone bending throughout an aircraft flight. More specifically, moving focal point $P_f$ forward as compared to known engine designs minimizes bending. Even more specifically, first load vector 122 and second load vector 120 intersect at focal point $P_f$, which lies within first vertical plane segment 126. The selection of the position of the point of intersection (as viewed from the side) of the load vectors of the engine forward mount and the engine aft mount with respect to axis of rotation 40 facilitates reducing or eliminating backbone bending of engine 10 during various engine operational modes.

It should be understood that the system described is statically determinate and that "fail safe' considerations would include additional "waiting fail-safe" features or additional links, making a non-statically determinate system of the same performance with respect to reducing backbone bending.

From the foregoing, it should be appreciated that the location of the forward focal point, $P_f$, and the aft focal point, $P_a$, can be achieved with combinations and configurations of links and mounting locations that differ from what is represented in the figures, and such other combinations and configurations are within the scope of the engine mounting system 100. Suitable alternatives can be readily ascertained by utilizing applied mathematics vector analysis to derive moments.

A technical effect of the methods, systems, and apparatus described herein is the ability to locate the forward focal point of the mounting system at or near a location relative to the inlet loading and engine centerline that can potentially reduce backbone bending to negligible levels, even in large turbofan gas turbine engines that generate high thrust levels. Additionally, the mounting system is capable of achieving this benefit while avoiding a substantial penalty in cost or weight typically associated with prior efforts to reduce backbone bending.

The above-described embodiments of a method and system of coupling on engine to an aircraft wing through a rigid mounting structure provides a cost-effective and reliable means for reducing load variations during different modes of operation. More specifically, the methods and systems described herein also facilitate improving build clearances for the high-pressure compressor and the high-pressure turbine. As a result, the methods and systems described herein facilitate coupling the engine to the aircraft in a cost-effective and reliable manner.

Exemplary embodiments of mounting systems are described above in detail. The mounting systems, and methods of operating such systems and devices are not limited to the specific embodiments described herein, but rather, components of systems and/or steps of the methods may be utilized independently and separately from other components and/or steps described herein. For example, the methods may also be used in combination with other systems requiring mounting of components, and are not limited to practice with only the systems and methods as described herein.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An engine and a mounting system for mounting the engine to an aircraft, the engine rotatable about an axis of rotation and including a center of gravity, a forward end, and an aft end opposite the forward end, comprising:

a rigid mounting structure configured to be coupled to the aircraft and including at least a forward mount interface, a link mount interface, and an aft mount interface, and each of said forward mount interface, said link mount interface, and said aft mount interface configured to receive a thrust component of a load;

an engine case surrounding the axis of rotation, said engine case including a link support connection;

a fan case at least partially surrounding said engine case, said fan case comprising an engine forward mount coupled to said forward mount interface, said engine forward mount angled toward the forward end of the engine at a first angle with respect to the axis of rotation, said first angle being an acute angle;

at least two thrust links extending between said link mount interface to said link support connection at a second angle with respect to the axis of rotation; and an engine aft mount spaced apart from said link support connection along an upper portion of said engine case and coupled to said aft mount interface, said engine aft mount angled toward the forward end of the engine at a third angle with respect to the axis of rotation, said third angle being an acute angle or an obtuse angle;

wherein a projection of a first load vector of said engine forward mount onto a vertical plane extending through the axis of rotation of the engine and a projection of a second load vector of each thrust link of said at least two thrust links onto the vertical plane intersect each other on the axis of rotation of the engine within a first vertical plane segment, the first vertical plane segment extending between a forward end of a nose of a fan assembly and forward of said forward mount interface; and wherein a projection of a third load vector of said engine aft mount onto the vertical plane intersects the axis of rotation of the engine within at least one of a second vertical plane segment and a third vertical plane segment, the second vertical plane segment extending between a fan frame and forward of said aft mount interface, the third vertical plane segment extending between the aft end of the engine and aft of said aft mount interface.

2. The engine and the mounting system of claim 1, wherein said rigid mounting structure is coupled to a wing of the aircraft.

3. The engine and the mounting system of claim 1, wherein said second vertical plane segment extends between the center of gravity and forward of said aft mount interface.

4. The engine and the mounting system of claim 1, wherein said first angle is less than eighty degrees.

5. The engine and the mounting system of claim 1, wherein said third angle is less than eighty-five degrees.

6. The engine and the mounting system of claim 1, wherein said third angle is greater than ninety-five degrees.

7. The engine and the mounting system of claim 1, wherein said third angle is greater than one hundred degrees.

8. A method of coupling an engine to an aircraft, said method comprising:
    coupling a rigid mounting structure to the aircraft, wherein the rigid mounting structure includes a forward mount interface, a link mount interface; and an aft mount interface, each of the forward mount interface, the link mount interface, and the aft mount interface configured to receive a thrust component of a load;
    coupling an engine structure about the engine such that the engine structure surrounds an axis of rotation of the engine, the engine structure including a thrust link support connection along an upper portion of the engine structure;
    coupling an engine forward mount to the forward mount interface at a first angle with respect to the axis of rotation;
    coupling at least two thrust links of a linkage structure to the link mount interface at a second angle with respect to the axis of rotation; and
    coupling an engine aft mount to the aft mount interface at a third angle with respect to the axis of rotation;
    wherein the first angle is an acute angle;
    said third angle being an acute angle or an obtuse angle;
    wherein a projection of a first load vector of the engine forward mount onto a vertical plane extending through the axis of rotation of the engine and a projection of a second load vector of each thrust link of the at least two thrust links onto the vertical plane intersect each other on the axis of rotation of the engine within a first vertical plane segment that extends through the axis of rotation and that extends between a forward end of a nose of a fan assembly and forward of the forward mount interface, and
    wherein a projection of a third load vector of the engine aft mount onto the vertical plane intersects the axis of rotation of the engine within at least one of a second vertical plane segment and a third vertical plane segment, the second vertical plane segment extending between a center of gravity of the engine and forward of the aft mount interface, the third vertical plane segment extending between an aft end of the engine and aft of the aft mount interface.

9. The method in accordance with claim 8, wherein coupling the engine forward mount and coupling the at least two thrust links comprises coupling the engine forward mount and coupling the at least two thrust links such that the projection of the first load vector of the engine forward mount and a projection of each link of the at least two thrust links intersect the first vertical plane segment within a blade tip radius of the axis of rotation of the engine.

10. The method in accordance with claim 8, wherein coupling at least two thrust links of a linkage structure to the link mount interface comprises pivotably coupling the at least two thrust links of the linkage structure to the link mount interface.

11. An engine of an aircraft and a mounting system for mounting the engine, the engine having a core engine including a compressor and a low-pressure turbine arranged axisymmetrically about an axis of rotation, comprising;
    a mounting structure configured to be coupled to an exterior of the aircraft;
    a forward mount interface coupled to said mounting structure forward of the center of gravity of the engine, said forward mount interface coupled to a fan frame of the engine by an engine forward mount forming a first angle with respect to the axis of rotation;
    a link mount interface coupled to said mounting structure aft of the center of gravity of the engine, said link mount interface coupled to a turbine frame of the engine through at least two thrust links and forming a second angle with respect to the axis of rotation; and
    an aft mount interface coupled to said mounting structure aft of said low-pressure turbine, said aft mount interface coupled to the turbine frame forming a third angle with respect to the axis of rotation;
    wherein each of said forward mount interface, said link mount interface, and said aft mount interface configured to receive a thrust component generated by the engine,
    wherein the first angle is an acute angle; and
    Said third angle being an acute angle or an obtuse angle; and
    wherein a projection of a first load vector of said engine forward mount onto a vertical plane extending through the axis of rotation and a projection of a second load vector of each thrust link of said at least two thrust links onto the vertical plane intersect each other on the axis of rotation.

12. The engine and the mounting system of claim 11, wherein said engine comprises a compressor, said forward mount interface is coupled to said mounting structure forward of an axial midpoint of the compressor.

13. The engine and the mounting system of claim 11, wherein said engine comprises a compressor, said link mount interface is coupled to said mounting structure aft of an axial midpoint of the compressor.

14. The engine and the mounting system of claim 11, wherein said first angle is an acute angle.

15. The engine and the mounting system of claim 14, wherein said first angle is less than approximately eighty degrees and greater than approximately sixty degrees.

16. The engine and the mounting system of claim 14, wherein said first angle is less than approximately sixty degrees and greater than approximately ten degrees.

17. The engine and the mounting system of claim 11, wherein said second angle is an acute angle.

18. The engine and the mounting system of claim 11, wherein said third angle is at least one of an acute angle and an obtuse angle.

19. The engine and the mounting system of claim 18, wherein said third angle is greater than approximately ninety-five degrees such that engine aft mount intersects axis of rotation aft of engine aft mount.

20. The engine and the mounting system of claim 11, wherein the projection of the first load vector of said forward mount interface and the projection of the second load vector of each thrust link of said at least two thrust links intersect within a blade tip radius of said axis of rotation of said engine.

* * * * *